(12) United States Patent
Schrunk et al.

(10) Patent No.: US 8,561,445 B2
(45) Date of Patent: Oct. 22, 2013

(54) ROUNDING SYSTEM AND METHOD USED IN THE MANUFACTURE OF WIND TOWERS

(75) Inventors: David Schrunk, Canby, MN (US); Mitch Groen, Canby, MN (US)

(73) Assignee: SMI & Hydraulics, Inc., Porter, MN (US)

( * ) Notice: Subject to any disclaimer, the term of this patent is extended or adjusted under 35 U.S.C. 154(b) by 779 days.

(21) Appl. No.: 12/417,184

(22) Filed: Apr. 2, 2009

(65) Prior Publication Data

US 2010/0095729 A1   Apr. 22, 2010

Related U.S. Application Data

(60) Provisional application No. 61/107,073, filed on Oct. 21, 2008.

(51) Int. Cl.
| | |
|---|---|
| *B21D 15/00* | (2006.01) |
| *B21D 9/05* | (2006.01) |
| *B21D 31/00* | (2006.01) |
| *B21D 19/12* | (2006.01) |
| *B21B 39/02* | (2006.01) |

(52) U.S. Cl.
USPC ............... 72/110; 72/389.1; 72/133; 72/48

(58) Field of Classification Search
USPC .......... 72/80, 110, 389.1, 370.25, 133, 166, 72/169, 48, 51
See application file for complete search history.

(56) References Cited

U.S. PATENT DOCUMENTS

| | | | | |
|---|---|---|---|---|
| 241,424 | A * | 5/1881 | Rolston | 72/110 |
| 365,053 | A * | 6/1887 | Daniels | 72/110 |
| 437,270 | A * | 9/1890 | Washburn | 72/110 |
| 455,186 | A * | 6/1891 | Elmore | 72/110 |
| 790,643 | A * | 5/1905 | Linehan | 72/80 |
| 1,753,963 | A * | 4/1930 | Mauser | 72/110 |
| 1,930,562 | A * | 10/1933 | Krueger | 72/106 |
| 1,985,039 | A * | 12/1934 | Krueger | 72/94 |
| 2,090,838 | A * | 8/1937 | Gustafson | 157/1.5 |
| 2,331,689 | A * | 10/1943 | Hodge | 228/164 |
| 2,382,485 | A * | 8/1945 | Ingersoll | 29/894.325 |
| 2,384,457 | A * | 9/1945 | Dewey | 72/100 |
| 2,719,324 | A * | 10/1955 | Gray et al. | 425/367 |
| 2,767,466 | A * | 10/1956 | Faulkner | 445/36 |
| 3,000,426 | A * | 9/1961 | Ducker et al. | 72/110 |
| 3,154,848 | A * | 11/1964 | Powell | 29/516 |
| 3,230,606 | A * | 1/1966 | Saito et al. | 29/898.066 |
| 3,464,253 | A * | 9/1969 | Boyles et al. | 72/364 |
| 3,699,792 | A * | 10/1972 | Pettazzi | 72/110 |

(Continued)

FOREIGN PATENT DOCUMENTS

| | | |
|---|---|---|
| EP | 1149643 | 10/2001 |
| WO | 02/20208 | 3/2002 |

OTHER PUBLICATIONS

International Search Report dated May 18, 2010 for corresponding PCT/US2009/061274 filed Oct. 20, 2009.

*Primary Examiner* — Dana Ross
*Assistant Examiner* — Lawrence Averick
(74) *Attorney, Agent, or Firm* — The Patentwise Group, LLC

(57) ABSTRACT

A can rounding system and method that uses arms that are able to maintain cans in a concentric arrangement during the welding process. The arms enable the can rounding system to maintain the concentric positions in order to achieve improved circular dimensions and increase the overall efficiency in the construction of cylindrical and conical structures, such as wind towers.

20 Claims, 7 Drawing Sheets

(56) References Cited

U.S. PATENT DOCUMENTS

| | | | |
|---|---|---|---|
| 3,738,149 A * | 6/1973 | Archer | 72/171 |
| 3,824,820 A * | 7/1974 | Jeuken et al. | 72/12.1 |
| 3,992,910 A * | 11/1976 | Connell et al. | 72/10.7 |
| 3,992,911 A * | 11/1976 | Connell et al. | 72/8.3 |
| 3,992,914 A * | 11/1976 | Connell | 72/106 |
| 4,606,208 A * | 8/1986 | Williamson | 72/133 |
| 4,628,721 A * | 12/1986 | Williamson | 72/96 |
| 4,706,488 A * | 11/1987 | Williamson | 72/96 |
| 4,726,210 A * | 2/1988 | Weil et al. | 72/133 |
| 5,076,087 A | 12/1991 | Slater | |
| 5,105,639 A * | 4/1992 | Castricum | 72/49 |
| 5,120,177 A | 6/1992 | Stieger | |
| 5,533,370 A * | 7/1996 | Kuroda et al. | 72/12.5 |
| 5,607,098 A * | 3/1997 | Kusakabe et al. | 228/17 |
| 5,829,292 A * | 11/1998 | Andriessen | 72/110 |
| 6,490,900 B1 * | 12/2002 | Oliver et al. | 72/224 |
| 7,451,629 B2 * | 11/2008 | Dickinson | 72/49 |
| 7,451,631 B2 * | 11/2008 | Dickinson | 72/367.1 |
| 2009/0212024 A1 * | 8/2009 | Muller et al. | 219/61 |
| 2010/0139802 A1 * | 6/2010 | Papon et al. | 138/141 |
| 2010/0264131 A1 * | 10/2010 | Moe et al. | 219/635 |

* cited by examiner

ROUNDING SYSTEM AND METHOD USED IN THE MANUFACTURE OF WIND TOWERS

This Application claims the benefit of U.S. Provisional Patent Application No. 61/107,073 filed Oct. 21, 2008, the contents of which are herein incorporated by reference.

BACKGROUND OF THE INVENTION

1. Field of the Invention

The invention relates to the field of manufacturing conical or cylindrical shaped structures. In particular the present invention is related to stabilizing a can used in the construction of cylindrical or conical shaped structures during the can rounding process.

2. Description of the Related Technology

In light of the increased cost of energy for traditional non-renewable energy sources people have begun to take more of an interest in renewable energy sources. One type of renewable energy sources is wind energy and its popularity is evidenced by the increasing number of wind towers that dot the landscape.

In the construction of wind towers, conical or cylindrical shaped "cans," are welded together in order to form the towers. FIGS. 1(a) and 1(b) show cylindrical can 10a and conical can 11a which are illustrative of cans used in the manufacture of wind towers. Cans may be constructed of any material and are typically made of metal in the construction process described below. Dimensions for cans used in this type of manufacture may range between 7 to 20 feet.

In the wind tower manufacturing industry, the current method of fabrication and welding has no effective way of butting the cans up to one another in a concentric manner. When welding cans using standard methods may be supported at their base and two cans are placed in abutment and welded together. When the cans are welded together in this fashion frequently an imperfect weld is formed. This results in inefficiencies in the field and reduces the number of wind towers that can be effectively manufactured.

Therefore there is a need in the field to provide a method and system for uniformly rounding a can in order to create an efficient weld when forming a conical or cylindrical shaped structure.

SUMMARY OF THE INVENTION

An object of the present invention is a can rounding mechanism that stabilizes cans during the welding process.

Another object of the present invention is a method for stabilizing cans during the welding process.

A first aspect of the invention is a can rounding mechanism comprising: a base; a pair of upper arms connected to the base, wherein the pair of upper arms have at least one roller located at a distal end of each of the pair of upper arms; a pair of lower arms connected to the base, wherein the pair of lower arms have at least one roller located at a distal end of each of the pair of lower arms; and wherein when a can is placed in the can rounding mechanism the pair of upper arms contacts the can at a first portion of the can located above a mid-point of the can and the pair of lower arms contacts the can at second portion of the can located below the mid-point of the can.

Another aspect of the invention is a system for rounding cans comprising: a can having a perimeter, wherein the perimeter extends around the circumference of the can from 0° to 360°, wherein a quadrant I extends from 0° to 90° around the circumference of the can, a quadrant II extends from 90° to 180° around the circumference of the can, a quadrant III extends from 180° to 270° around the circumference of the can and a quadrant IV extends from 270° to 360° around the circumference of the can; a can rounding mechanism comprising a base; a first arm connected to the base, wherein the first arm has at least one roller located at a distal end of the arm; a second arm connected to the base, wherein the second arm has at least one roller located at a distal end of the second arm; and wherein the first arm contacts the can at within quadrant I or quadrant IV of the can and the second arm contacts the can at quadrant II or quadrant III of the can.

Yet another aspect of the invention is a method for rounding cans comprising: placing a first can in a can rounding mechanism, wherein the can rounding mechanism comprises: a base; a pair, of upper arms connected to the base, wherein the pair of upper arms have at least one roller located at a distal end of each of the pair of upper arms; a pair of lower arms connected to the base, wherein the pair of lower arms have at least one roller located at a distal end of each of the pair of lower arms; and wherein when the first can is placed in the can rounding mechanism the pair of upper arms contacts the first can at a first portion of the first can located above a mid-point of the first can and the second pair of lower arms contacts the first can at second portion of the first can located below the mid-point of the first can; and welding the first can to a second can.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1B:
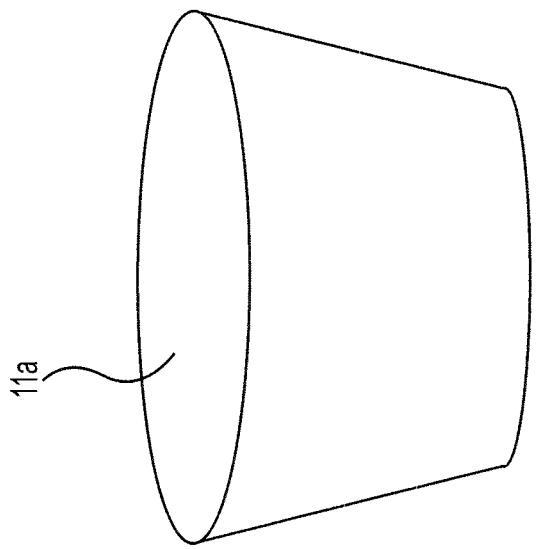
FIG. 1(b) shows a conical shaped can.
Figure 1A:
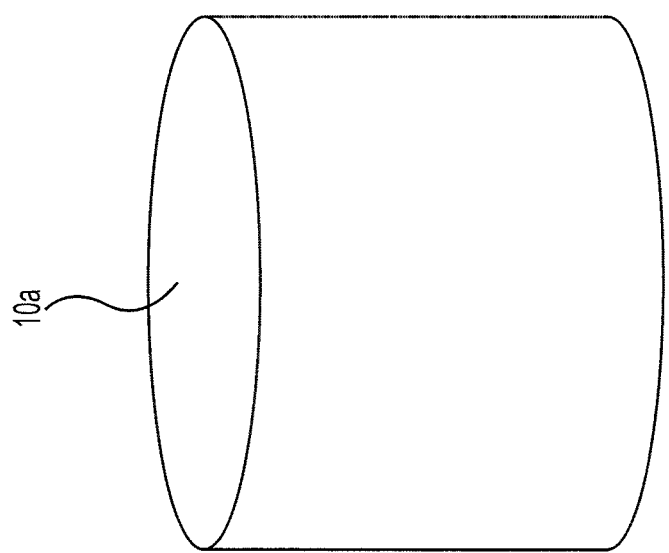
FIG. 1(a) shows a cylindrical shaped can.
Figure 2:
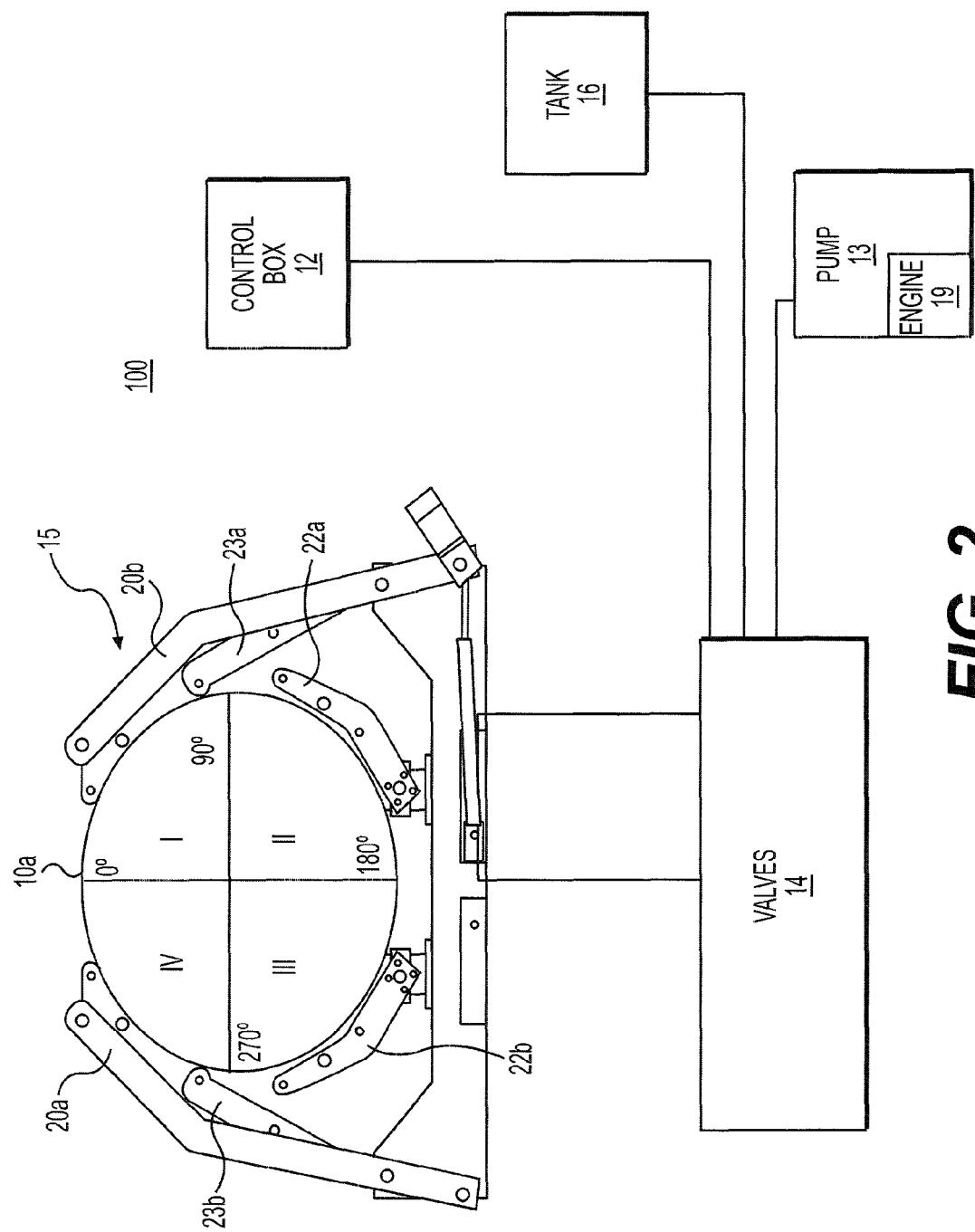
FIG. 2 shows the can rounding system in accordance with an embodiment of the present invention.
Figure 3:
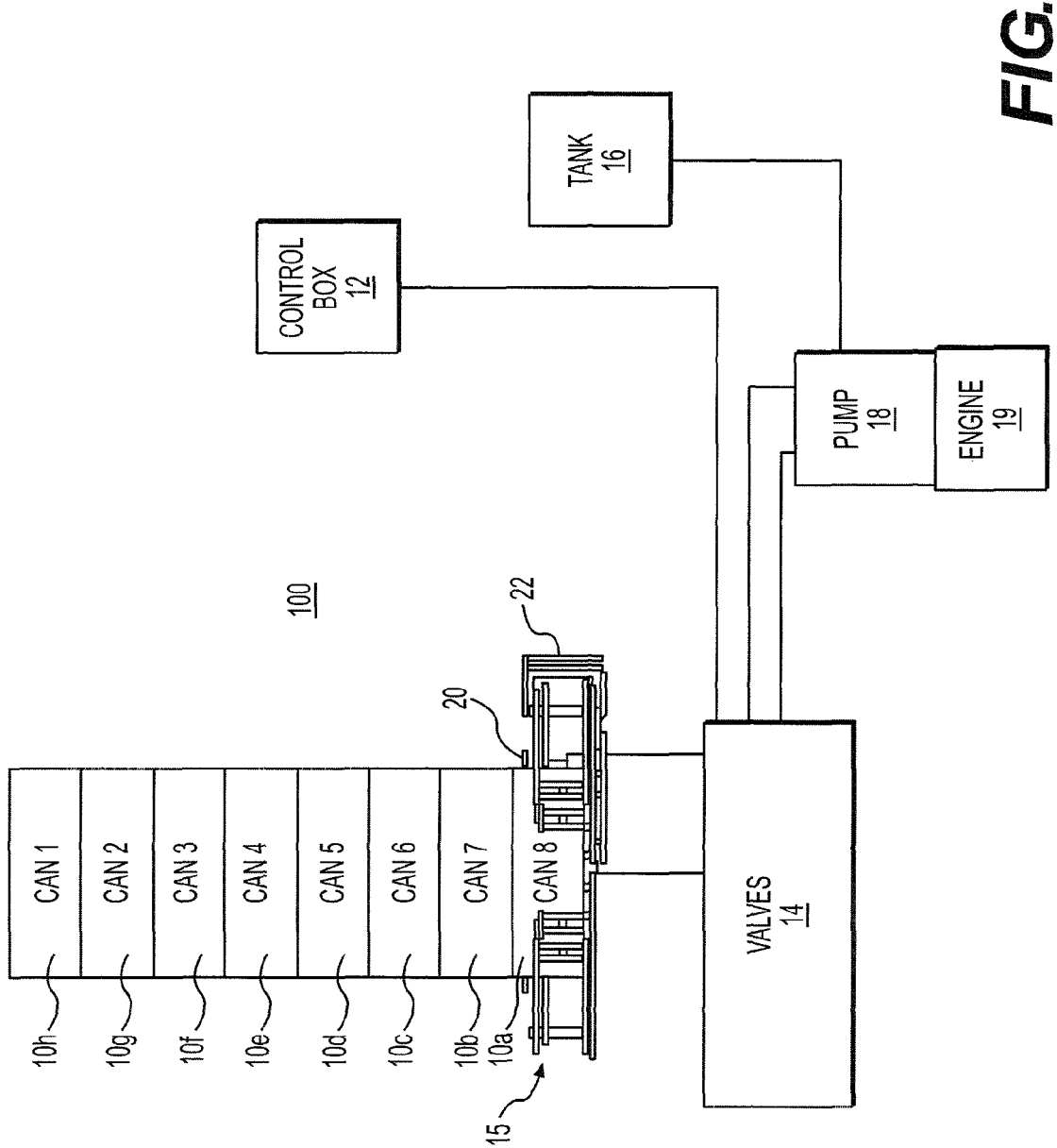
FIG. 3 shows the can rounding system illustrating a queue of cans in accordance with an embodiment of the present invention.

FIGS. 2 and 3 show the can rounding system 100 used in the construction and welding of the cans in the formation of wind towers. While the present invention is discussed in view of construction of a wind tower, it should be understood that other end products may employ this system and method described herein. For example, pressure vessels or large tanks may also employ the inventive method and system described herein. Indeed, any construction requiring the welding of cans can employ the system and method of the present invention.

Still referring to FIGS. 2 and 3, the can rounding system 100 has a can rounding mechanism 15 that holds can 10a. In FIG. 2 the can rounding mechanism 15 is shown holding the can 10a in an upright position. This is the position in which the welding process occurs. The can 10a has a mid-portion demarcated by the line A which extends across the diameter of the can 10a horizontally. The line B bisects the can 10a vertically and is used herein for reference purposes. In the embodiment shown in FIGS. 2 and 3 the intersecting lines A and B form four quadrants around the circumference of the can 10a. Quadrant I extends from 0° to 90° around the circumference of the can 10a, quadrant II extends from 90° to 180° around the circumference of the can 10a, quadrant III extends from 180°-270° around the circumference of the can 10a and quadrant IV extends from 270° to 360° around the circumference of the can 10a. The diameter of the can 10a is between the ranges of 5-25 feet, and preferably between 7 and 20 feet in diameter. It should be understood that the diameter of the cans may vary based upon the resulting process for which the end constructed product is to be used. Furthermore, when constructing a conical shaped structure it should be understood that the diameter of the cans used will change throughout the fabrication of the resulting structure.

Still referring to FIGS. 2 and 3, the can rounding system 100 additionally has a control box 12 that is operatively connected to the valves 14, which hydraulically control the can rounding mechanism 15. Operatively connected to the valves 14 are tank(s) 16 and a pump 18 and engine 19. The tank(s) 16 and the pump 18 provide the hydraulic pressure necessary for the operation of the valves 14 and the can rounding mechanism 15. The can rounding mechanism 15 is controlled with the valves 14 and operated through the usage of the control box 12. While the control box 12 is illustrated as being physically connected to the valves 14, it should be understood that the control box 12 may be wireless. It should also be understood that various sub-components are used in the formation of the can rounding system 100 such as electrical circuits, blocks, solenoids, pumps, tanks, hoses, and cylinders (not shown) the function and usage of which are known to the skilled artisan in the field.

Once the can rounding system 100 is initiated by the operator, the electrical circuit energized solenoids pass oil to a cylinder which applies force to the force points which contact the can 10a. FIG. 3 shows the can 10a-10h arranged in a queue so as to be moved into position in order to weld the cans 10a-10h together. By using a control box 12 and hydraulic cylinders, this mechanism can adapt different sized cans 10a-10h.

Figure 4:
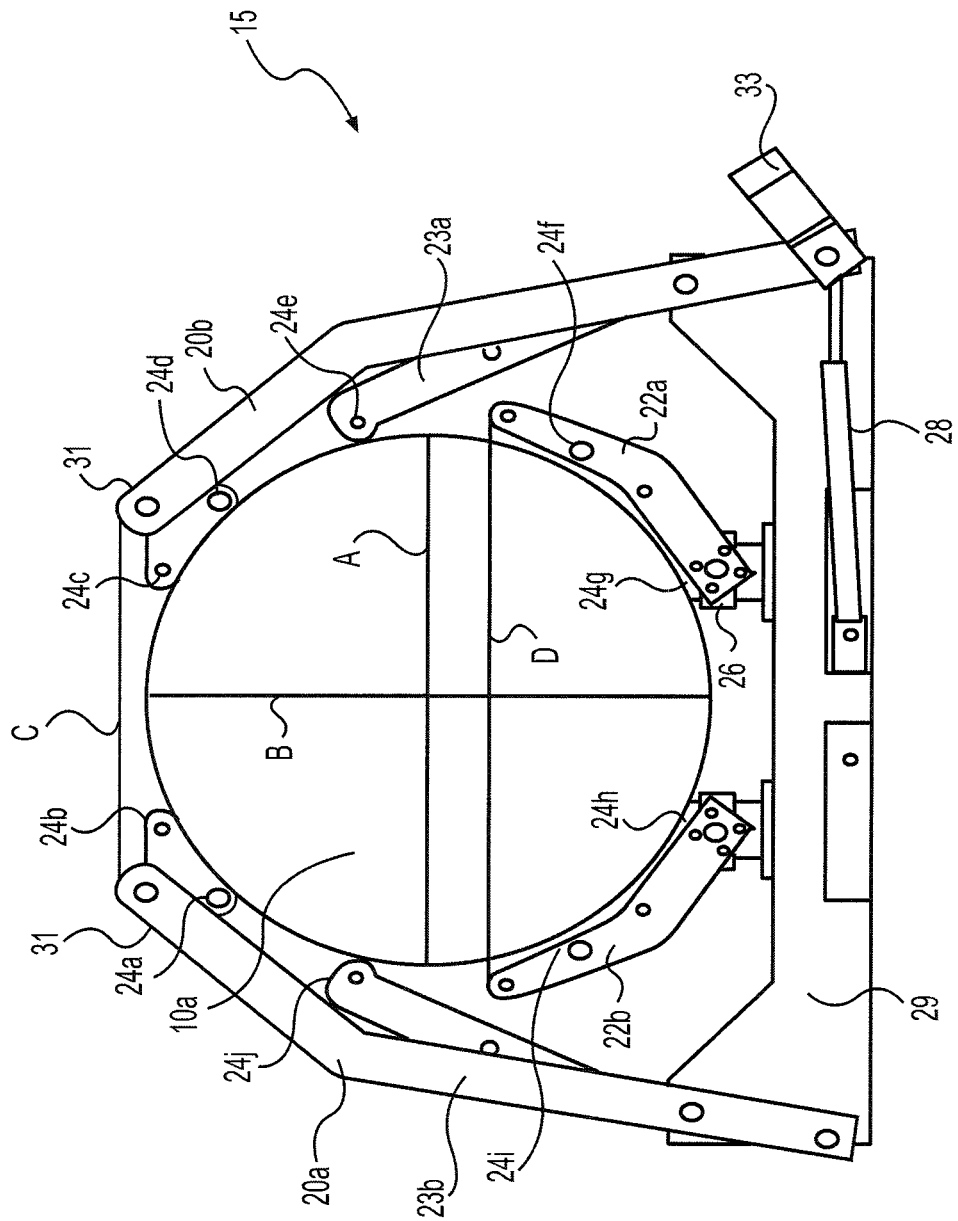
FIG. 4 is a front view of the can rounding mechanism in accordance with an embodiment of the present invention.

Referring to FIG. 4, adaption to different sized cans is accomplished by moving at least one of the upper arms 20a, 20b in a direction so as to increase the distance C between the distal ends 31 of the upper arms 20a, 20b. The distance between the upper arms 20a, 20b is adjustable so as to accommodate a can having a diameter between 5 to 25 feet, and more particularly between 7 to 20 feet. Additionally the distance, D, between the ends of the lower arms 22a, 22b can also be changed by moving at least one of the lower arms 22a, 22b in a direction away from the other lower arm. The distance between the lower arms 22a, 22b is adjustable so as to accommodate a can having a diameter between 5 to 25 feet, and more particularly 7 to 20 feet. The distances between the lower arms 22a and 22b may be between 4 to 8 feet.

Figure 5:
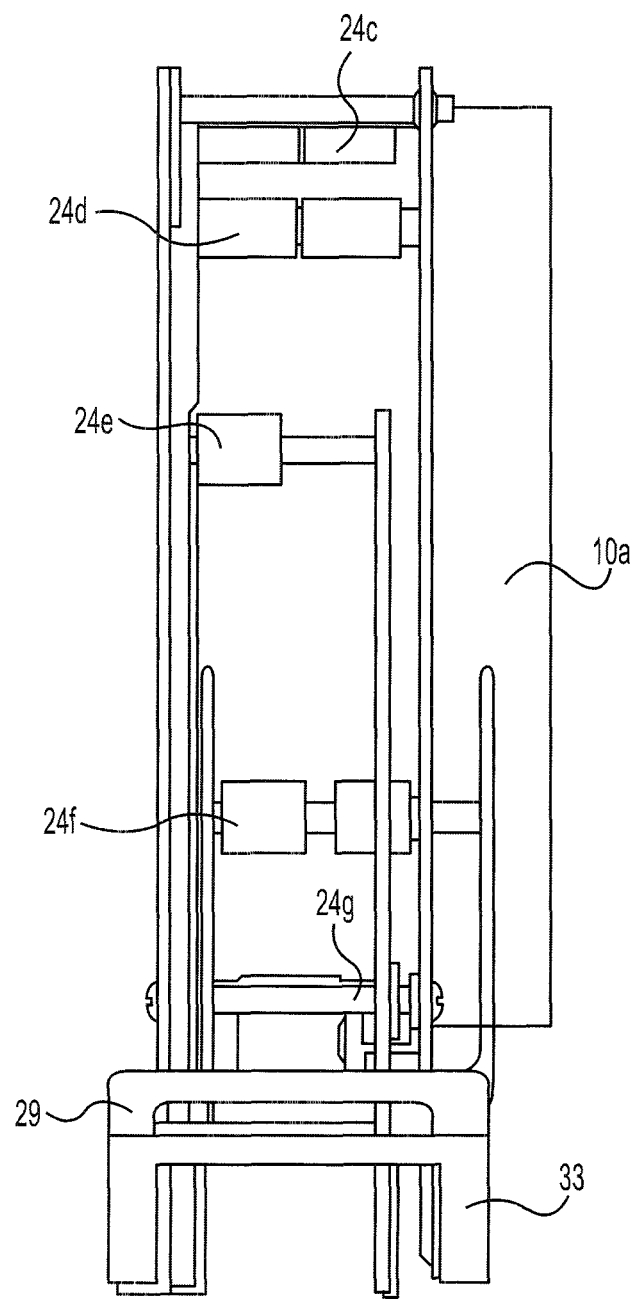
FIG. 5 is a side view of the can rounding mechanism shown in FIG. 3.
Figure 6:
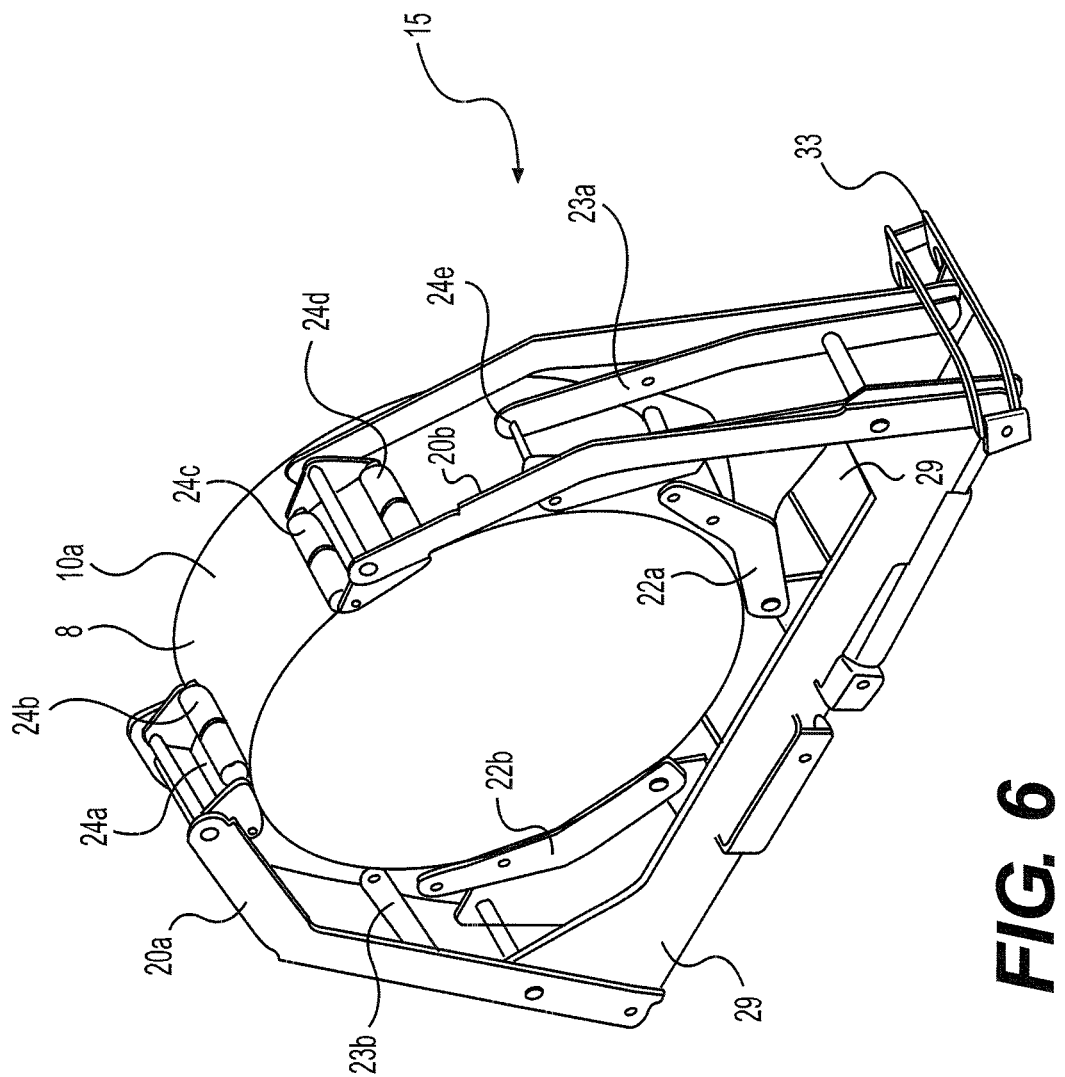
FIG. 6 is an isometric view of the can rounding mechanism shown in FIG. 3.

Now referring to FIGS. 4-6 where views of the can rounding mechanism 15 are shown. The can rounding mechanism 15 has a base 29. The base 29 is constructed so that the rollers 24h-24i can be moved so as to adjust to different sized cans.

In the embodiment shown in FIG. 4 the base 29 is slidable so as to accommodate different sized cans. Operatively connected to the base 29 is the hydraulic cylinder 28 which is connected to the valves 14 and operated through the control box 12, shown in FIGS. 2 and 3. Support structure 33 is located at the end of the base 29 and provides additional strength for the arms. The support structure 33 extends at an angle with respect to the base 29.

Located at the distal ends of the base 29 is a pair of upper arms 20a, 20b. Each upper arm 20a and 20b is movably connected to the base 29, however in alternative embodiments only one of the upper arms 20a, 20b may be movably connected.

The pair of upper arms 20a, 20b contacts the can portion 10a above the horizontal axis A. Each of the upper arms 20a, 20b of the first pair have rollers 24a-24d located at the distal ends 31a, 31b of the upper arms 20a, 20b. The double set of rollers, e.g. 24a, 24b, is used in order to place force over more area of the can 10a. The rollers 24a-24d contact the perimeter 8 of the can 10a so as to keep it stabilized in order to provide an improved weld. The rollers 24a-24d operate to guide and support the can portion 10a during the can rounding process. Rollers Each of the rollers 24a-24d located at the distal ends 31a, 31b may contact the perimeter 8 of the can 10a at equivalent locations within their respective quadrants. For example, in the embodiment shown in FIGS. 4-6, roller 24a and 24d and rollers 24b and 24c may be located at equivalent locations along the circumference of the can 10a. Roller 24a would be located at 315° along the circumference of the can 10a, while roller 24d would be located at 45° along the circumference of the can 10a. Likewise, roller 24b would be located at 325° along the circumference of the can 10a, while roller 24c would be located at 35° along the circumference of the can 10a. It should be understood that the locations of the placement of the rollers 24a-24d may vary depending upon the size and shape of the can 10a and the numbers provided above are for illustrative purposes only. Force points where the rollers 24a-24d contact the perimeter 8 may be located at any degree angle around the can portion 10a. It is important however to provide force to the top half of the can 10a during the welding process in order to improve efficiency and stabilization. Furthermore, in the event that a large force is required for the rounding process the rollers may be used as restraint.

Still referring to FIGS. 4-6, side arm 23a provides additional force to the perimeter 8 of the can 10a via the roller 24e located at the distal end of side arm 23a. Side arm 23a is adjustable and so is able to accommodate varying sizes of cans. Roller 24e contacts the perimeter 8 of the can 10a above the horizontal axis A. In the embodiment shown it contacts the perimeter 8 in quadrant I at 75° along the circumference of the can 10a, although it may contact the perimeter in quadrant II in alternative embodiments. It is possible to adjust the side arm 23a to contact the perimeter 8 of the can 10a at other locations within quadrant I. Preferably side arm 23a contacts the can 10a at a location below where arm 20b contacts the can 10a, but above the location where lower arm 22a contacts the can 10a.

Side 23b provides additional force to the perimeter 8 of the can 10a via the roller 24j located at the distal end of side arm 23b. Side arm 23b is adjustable and so is able to accommodate varying sizes of cans. Roller 24j contacts the perimeter 8 of the can 10a above the horizontal axis A. In the embodiment shown it contacts the perimeter 8 in quadrant IV at 285° along the circumference of the can 10a. It is possible to adjust the side arm 23b to contact the perimeter 8 of the can 10a at other locations within quadrant IV, although it may contact the perimeter in quadrant III in alternative embodiments. Preferably side arm 23b contacts the can 10a at a location below where arm 20a contacts the can 10a, but above the location where lower arm 22b contacts the can 10a.

Still referring to FIGS. 4-6, lower arms 22a and 22b support the can 10a during the welding process. Lower arm 22a has rollers 24f and 24g. Lower arm 22b has rollers 24h and 24i. Each of the lower arms 22a, 22b contacts the can 10a below the horizontal axis A. Lower arm 22a contacts the can 10a in quadrant II and lower arm 22b contacts the can 10a in quadrant III.

Each of the rollers 24f-24i located on lower arms 22a, 22b may contact the perimeter 8 of the can 10a at equivalent locations within their respective quadrants. Rollers 24f-24i are operatively connected to the lower arms 22a and 22b, with rollers 24g and 24h being located where the lower arms 22a, 22b, are connected to the base 29.

In the embodiment shown in FIGS. 4-6, roller 24f and 24i and rollers 24g and 24h may be located at equivalent locations along the circumference of the can 10a. For example, roller 24f would be located at 120° along the circumference of the can 10a, while roller 24i would be located at 240° along the circumference of the can 10a. Likewise, roller 24g would be located at 150° along the circumference of the can 10a, while roller 24h would be located at 210° along the circumference of the can 10a. It should be understood that the locations of the placement of the rollers 24f-24i may vary depending upon the size and shape of the can 10a and the numbers provided above are for illustrative purposes only. Force points where the rollers 24a-24d contact the perimeter 8 may be located at any degree angle around the can portion 10a. It is important however to provide support to the bottom half of the can 10a during the welding process in order to improve efficiency and stabilization. In the event that a large force is required for the rounding process the rollers may be used as restraint.

While the above embodiment is illustrated having upper arms 20a, 20b, side arm 23a, 23b and lower arms 22a, 22b, there may be more or less arms depending on the needs of the construction process. Furthermore, it is contemplated that while arms with rollers are shown it may be possible to provide force to the portion of the can 10a above the horizontal axis A via other means; however the arms are an effective way to restrain the can 10a.

Figure 7:
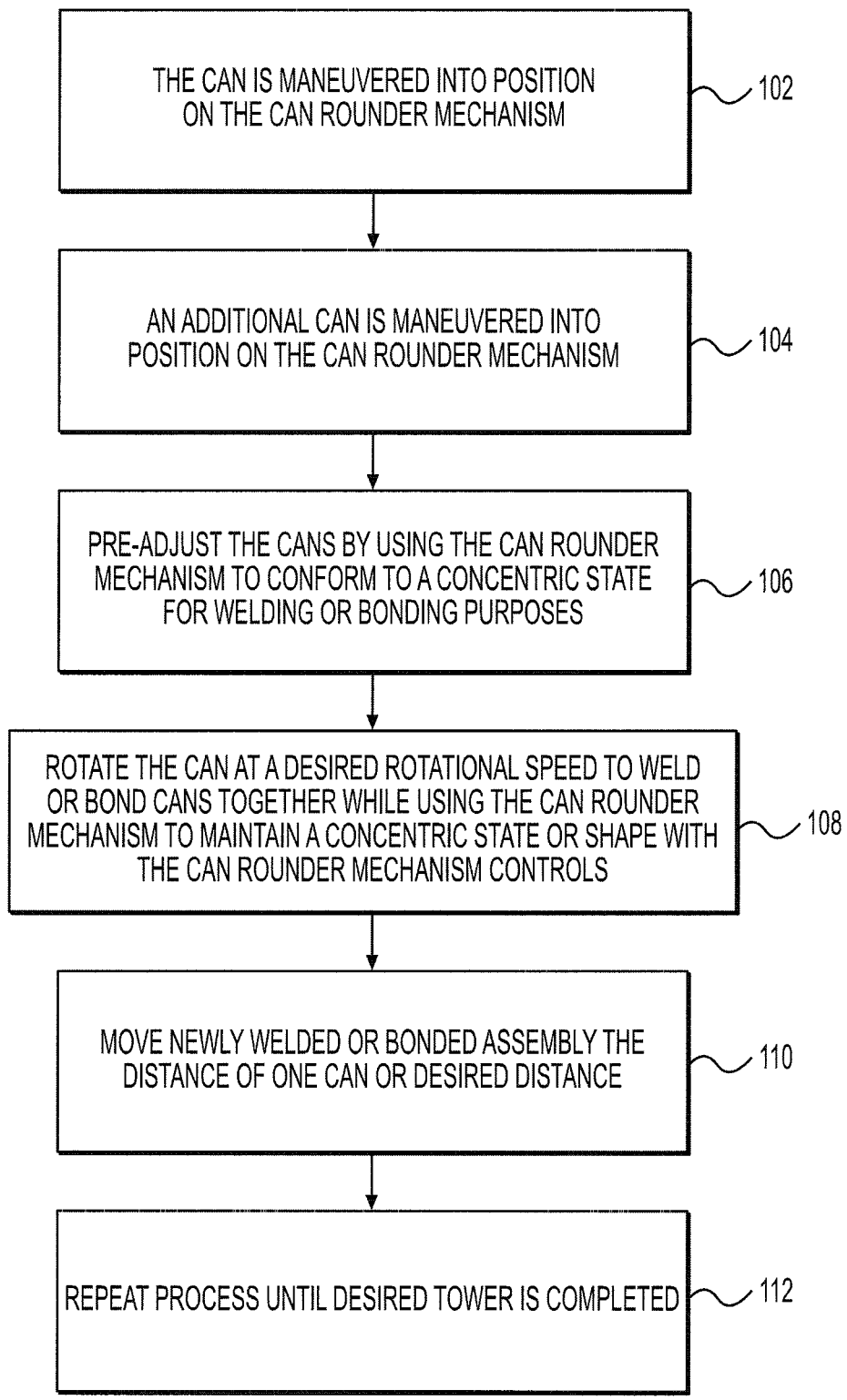
FIG. 7 is a flow chart showing the method for producing wind towers using the can rounding system of the present invention.

FIG. 7 sets forth the method for welding the cans 10a-10g together. In step 102, the can 10a is maneuvered into position on the can rounding mechanism 15.

In step 104 an additional can 10b is also maneuvered into position on the can rounding mechanism 15. The can portions 10a-10h can be placed into position using any mechanism that is able to transport the can portions 10a-10h to their desired location on the can rounding mechanism 15. Such mechanisms may be forklifts, cranes, etc.

In step 106, the can portion 10a is pre-adjusted by using the can rounding mechanism 15 to conform to a concentric state for welding or bonding purposes. This pre-adjustment occurs through the usage of the can rounding mechanism 15 via usage of the arms 20a, 20b, the arms 22a, 22b and arms 23a, 23b, in the embodiment shown in FIGS. 2-6.

In step 108, the can portion 10a is rotated at a desired rotational speed through the usage of drive roller mechanism, in order to weld, or bond the cans 10a-10h together while using the can rounding mechanism 15 and the force exerted by the arms 20a, 20b, 22a, 22b, 23a, 23b, on the perimeter 8 of the cans 10a-10h. The application of force on the perimeter 8 of the cans 10a-10h helps enable the maintenance of a concentric state or shape.

In step 110 the newly welded and/or bonded can assembly is moved the distance of one can and/or a desired distance in order to finish construction of the wind tower.

In step 112, the process is repeated until all of the desired cans 10a-10h are welded together in order to create the tower.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A wind tower can rounding mechanism comprising:
a base;
rounding means for adjusting a wind tower can having a diameter between 7 and 20 feet to a concentric shape, the rounding means comprising:
a pair of upper arms connected to the base, wherein the pair of upper arms have at least one roller located at a distal end of each of the pair of upper arms;
a pair of lower arms connected to the base, wherein the pair of lower arms have at least one roller located at a distal end of each of the pair of lower arms;
wherein when a can is placed in the rounding means the pair of upper arms contacts the can at a first portion of the can located above a mid-point of the can and simultaneously the pair of lower arms contacts the can at second portion of the can located below the mid-point of the can; and
wherein the rounding means further includes a control system for controlling a force application from at least one of the rollers to the can in order to facilitate adjustment of the can to a concentric shape.

2. The wind tower can rounding mechanism of claim 1, further comprising a side arm connected to the base.

3. The wind tower can rounding mechanism of claim 2, wherein the side arm has a roller adapted to contact the can at first portion of the can located above a mid-point of the can.

4. The wind tower can rounding mechanism of claim 1, wherein the pair of upper arms have a pair of rollers located at a distal end of each of the first pair of upper arms.

5. The wind tower can rounding mechanism of claim 1, wherein at least one of the pair of upper arms is movable so as to increase a distance between the distal ends of the first pair of upper arms.

6. The wind tower can rounding mechanism of claim 5, wherein the distance between the upper arms is adjustable so as to accommodate a can having a diameter between 7 to 20 feet.

7. The wind tower can rounding mechanism of claim 1, wherein at least one of the pair of lower arms is movable so as to increase a distance between the pair of lower arms.

8. The wind tower can rounding mechanism of claim 7, wherein the distance between the lower arms is adjustable so as to accommodate a can having a diameter between 7 to 20 feet.

9. The wind tower can rounding mechanism of claim 1, wherein when a can is placed in the can rounding mechanism one of the pair of upper arms contacts the can in quadrant I, wherein quadrant I extends from 0° to 90° around the circumference of the can, and the other of the pair of upper arms contacts the can in quadrant IV, wherein quadrant IV extends from 270° to 360° around the circumference of the can.

10. A wind tower can rounding system, comprising:
a can having a perimeter, wherein the perimeter extends around the circumference of the can from 0° to 360°, wherein a quadrant I extends from 0° to 90° around the circumference of the can, a quadrant II extends from 90° to 180° around the circumference of the can, a quadrant III extends from 180° to 270° around the circumference of the can and a quadrant IV extends from 270° to 360° around the circumference of the can;
rounding means for adjusting a wind tower can having a diameter between 7 and 20 feet to a concentric shape, the rounding means comprising:
  a can rounding mechanism comprising a base;
  a first arm connected to the base, wherein the first arm has at least one roller located at a distal end of the arm;
  a second arm connected to the base, wherein the second arm has at least one roller located at a distal end of the second arm; and
  wherein the first arm contacts the can at quadrant I or quadrant IV of the can and simultaneously the second arm contacts the can at quadrant II or quadrant III of the can; and
  wherein the rounding means further includes a control system for controlling a force application from at least one of the rollers to the can in order to facilitate adjustment of the can to a concentric shape.

11. The wind tower can rounding system claim 10, further comprising a side arm connected to the base.

12. The wind tower can rounding system of claim 11, wherein the side arm has a roller adapted to contact the can at first portion of the can located above a mid-point of the can.

13. The wind tower can rounding system of claim 10, further comprising a third arm, wherein the third arm contacts the can within quadrant I or quadrant IV.

14. The wind tower can rounding system of claim 13, wherein at least one of the first arm and the third arm is movable so as to increase a distance between the first arm and the third arm.

15. The wind tower can rounding system of claim 14, wherein the distance between the first arm and the third arm is adjustable so as to accommodate a can having a diameter between 7 to 20 feet.

16. The wind tower can rounding system of claim 15, further comprising a fourth arm, wherein the fourth arm contacts the can within quadrant II or quadrant III.

17. The wind tower can rounding system of claim 16, wherein the distance between the second arm and the fourth arm is adjustable so as to accommodate a can having a diameter between 7 to 20 feet.

18. The wind tower can rounding system of claim 10, further comprising;
  a plurality of valves operatively connected to the can rounding mechanism;
  a tank operatively connected to a pump;
  a pump operatively connected to an engine; and
  wherein the control system comprises a control box adapted to control the can rounding mechanism.

19. The wind tower can rounding system of claim 10, wherein the can may be conical or cylindrical in shape.

20. A wind tower can rounding and assembly method, comprising:
  placing a first can in a can rounding mechanism, wherein the can rounding mechanism comprises:
  a base;
  a pair of upper arms connected to the base, wherein the pair of upper arms have at least one roller located at a distal end of each of the pair of upper arms;
  a pair of lower arms connected to the base, wherein the pair of lower arms have at least one roller located at a distal end of each of the pair of lower arms;
  the respective upper arms and the respective lower arms being sized and spaced so as to receive a wind tower can having a diameter between 7 and 20 feet;
  adjusting the can to a concentric shape using the rollers; and
  welding the first can to a second can.

* * * * *